United States Patent
Zubrod

(10) Patent No.: US 10,451,267 B2
(45) Date of Patent: Oct. 22, 2019

(54) WASTE-HEAT STEAM GENERATOR

(71) Applicant: Siemens Aktiengesellschaft, Munich (DE)

(72) Inventor: Horst Zubrod, Uttenreuth (DE)

(73) Assignee: Siemens Aktiengesellschaft, Munich (DE)

( * ) Notice: Subject to any disclaimer, the term of this patent is extended or adjusted under 35 U.S.C. 154(b) by 24 days.

(21) Appl. No.: 15/542,522

(22) PCT Filed: Jan. 20, 2016

(86) PCT No.: PCT/EP2016/051144
§ 371 (c)(1),
(2) Date: Jul. 10, 2017

(87) PCT Pub. No.: WO2016/116509
PCT Pub. Date: Jul. 28, 2016

(65) Prior Publication Data
US 2018/0266673 A1 Sep. 20, 2018

(30) Foreign Application Priority Data
Jan. 23, 2015 (EP) ..................... 15152291

(51) Int. Cl.
*F22B 1/18* (2006.01)
(52) U.S. Cl.
CPC .............. *F22B 1/1815* (2013.01); *F22B 1/18* (2013.01); *Y02P 80/154* (2015.11)
(58) Field of Classification Search
USPC ....................................................... 122/7 R
See application file for complete search history.

(56) References Cited

U.S. PATENT DOCUMENTS 3,177,659 A  4/1965  Berman
3,592,170 A * 7/1971  Burkle ............... F22B 29/12
                                                  122/406.4
(Continued)

FOREIGN PATENT DOCUMENTS

CN  1086292 A   5/1994
CN  103109048 A  5/2013
(Continued)

OTHER PUBLICATIONS

EP Search Report dated Jul. 27, 2015, for EP patent application No. 1512291.9.
(Continued)

*Primary Examiner* — Steven B McAllister
*Assistant Examiner* — John E Bargero
(74) *Attorney, Agent, or Firm* — Beusse Wolter Sanks & Maire

(57) ABSTRACT

A waste-heat steam generator has an exhaust gas channel in which at least one evaporator heating surface and at least one preheater heating surface are arranged. The evaporator heating surface and the preheater heating surface are connected together such that the preheater heating surface is arranged upstream of the evaporator heating surface on the feed-water side. The waste-heat steam generator also has a water separator arranged downstream of the evaporator heating surface on the feed-water side. An excess pipe length system is arranged outside of the exhaust gas channel and between the preheater heating surface and the evaporator heating surface on the feed-water side, the system being designed such that the feed water causes an overflow in a rising pipe of the excess pipe length system after completely filling the preheater heating surface and thus reaches the evaporator heating surface via a downpipe.

5 Claims, 3 Drawing Sheets

(56) References Cited

U.S. PATENT DOCUMENTS

| | | | |
|---|---|---|---|
| 5,159,897 A | | 11/1992 | Franke et al. |
| 5,293,842 A | * | 3/1994 | Loesel ............... F22D 1/003 |
| | | | 122/1 C |
| 5,404,708 A | | 4/1995 | Sigling et al. |
| 5,588,400 A | | 12/1996 | Stefan et al. |
| 5,983,639 A | * | 11/1999 | Kral ................. F22B 35/14 |
| | | | 110/101 C |
| 8,297,236 B2 | * | 10/2012 | Franke ............... F22B 29/06 |
| | | | 122/1 B |
| 2003/0000214 A1 | | 1/2003 | Grewe et al. |
| 2013/0167533 A1 | | 7/2013 | Brueckner et al. |
| 2014/0109547 A1 | | 4/2014 | Bruckner et al. |

FOREIGN PATENT DOCUMENTS

| | | |
|---|---|---|
| DE | 4303613 A1 | 8/1994 |
| EP | 0359735 A1 | 3/1990 |
| EP | 2385223 A1 | 11/2011 |
| GB | 974592 A | 11/1964 |
| JP | S63187003 A | 8/1988 |
| JP | h1182916 A | 3/1999 |
| JP | 2002235893 A | 8/2002 |
| JP | 2005009792 A | 1/2005 |
| KR | 20020065930 A | 8/2002 |
| KR | 20140037185 A | 3/2014 |
| WO | 2005068904 A2 | 7/2005 |

OTHER PUBLICATIONS

International Search Report dated Apr. 15, 2016, for PCT/EP2016/051144.
CN search report dated Aug. 3, 2018, for corresponding CN patent application No. 201680007025.1.

* cited by examiner

WASTE-HEAT STEAM GENERATOR

CROSS REFERENCE TO RELATED APPLICATIONS

This application is the US National Stage of International Application No. PCT/EP2016/051144 filed Jan. 20, 2016, and claims the benefit thereof. The International Application claims the benefit of European Application No. EP15152291 filed Jan. 23, 2015. All of the applications are incorporated by reference herein in their entirety.

FIELD OF INVENTION

The invention relates to a waste-heat steam generator.

BACKGROUND OF INVENTION

In a gas and steam turbine plant, the exhaust gas exiting a gas turbine is used for generating steam for the steam turbine. The heat transfer takes place in this case in a waste-heat steam generator which is arranged downstream of the gas turbine and in which there are arranged, in an exhaust-gas channel, a number of heating surfaces for pre-heating feed water, for generating steam and also for subsequently superheating steam. For this purpose, the heating surfaces are connected into the feed water/steam circuit of the steam turbine and are thus flowed through one after the other by the medium flowing in said circuit.

For the waste-heat steam generator arranged downstream of the gas turbine on the exhaust-gas side, a number of alternative design concepts come into consideration, namely the design as a once-through steam generator or the design as a circulation steam generator. In a once-through steam generator, the heating of evaporator pipes of the evaporator heating surfaces leads to evaporation of the flow medium in a single pass.

When starting up the waste-heat steam generator, a so-called water ejection can occur. This arises when the evaporation, occurring as a consequence of the heating of the evaporator pipes which begins after the start, of the flow medium present in said pipes happens for the first time. If this takes place, for example, in the center of the respective evaporator pipe, the quantity of water present downstream (also referred to as the "water plug") is pushed out of the respective evaporator pipe. In order to safely rule out the possibility of non-evaporated flow medium passing from the evaporator pipes into the downstream superheater heating surfaces, a water separator is normally provided between the evaporator heating surfaces and the downstream superheater heating surfaces. In said water separator, separated water is then fed to an expansion device. The steam formed during the expansion in the atmospheric expansion device is normally discharged to the surroundings, and this contributes significantly to water loss during the start-up of the waste-heat boiler. The water which accumulates during the expansion in the atmospheric expander can be fed again into the feed water/steam circuit. The water guided into the atmospheric expander increases the energy losses during the start-up of the waste-heat steam generator.

If such water ejection during the start-up is now to be avoided to the maximum possible extent, an obvious solution would consist in a valve being arranged downstream of the preheater heating surfaces, such that it is possible to regulate the feed water quantity flowing into the downstream evaporator heating surfaces. However, the preheater system must in this case be designed for a relatively high pump pressure, and this leads to additional costs.

SUMMARY OF INVENTION

An object of the invention is to provide a waste-heat steam generator which overcomes the above-described disadvantages during the start-up.

This object is achieved with the waste-heat steam generator having the features of the independent claim.

By virtue of the fact that, outside the exhaust-gas channel and between the at least one preheater heating surface and the at least one evaporator heating surface on the feed-water side, there is arranged an excess pipe length system which is designed in such a way that, after the complete filling of the at least one preheater heating surface, feed water, in a riser of the excess pipe length system, reaches an overflow and thus passes into the at least one evaporator heating surface via a down pipe, it is possible for the water level in the at least one evaporator heating surface to be set as desired, despite the completely filled preheater heating surface(s). Since, in contrast to the known solution, no valve is provided downstream of the preheater heating surfaces, these pressure parts can be designed for the relatively low design pressure on the steam side of the waste-heat steam generator.

Overall, the arrangement according to the invention thus leads to a significant reduction in the water loss during the start-up of the waste-heat steam generator and therefore to relatively low energy losses. Additionally, in comparison to the known solution, the costs for the waste-heat steam generator according to the invention are significantly lower. Furthermore, as a result of the design and arrangement, according to the invention, of the waste-heat steam generator with the excess pipe length system, the economizer system, comprising the at least one preheater heating surface, is always completely filled, and so the downstream water separator can be suspended in a relatively low position. This leads to relatively short pipe lines in this region and therefore to a further cost saving.

Advantageously, between the at least one evaporator heating surface and an atmospheric expansion device, there is provided a dewatering line with at least one dewatering valve for dewatering the at least one evaporator heating surface and/or, between the overflow of the excess pipe length system and a steam discharge line of the water separator, there is provided a vent line with a vent valve. The valves which are arranged in these auxiliary lines can be used to adjust, independently of the system pressure, the level of the feed water in the at least one evaporator heating surface prior to each starting state.

In order to measure the water level in the evaporator heating surfaces, a suitable level measurement means is to be installed. For this purpose, parallel to the at least one evaporator heating surface, there is advantageously provided a measurement line and a pressure-measurement device for measuring the level of the feed water in the at least one evaporator heating surface.

BRIEF DESCRIPTION OF THE DRAWINGS

The invention will now be explained by way of example on the basis of the figures which follow, in which.

DETAILED DESCRIPTION OF INVENTION

Figure 1:
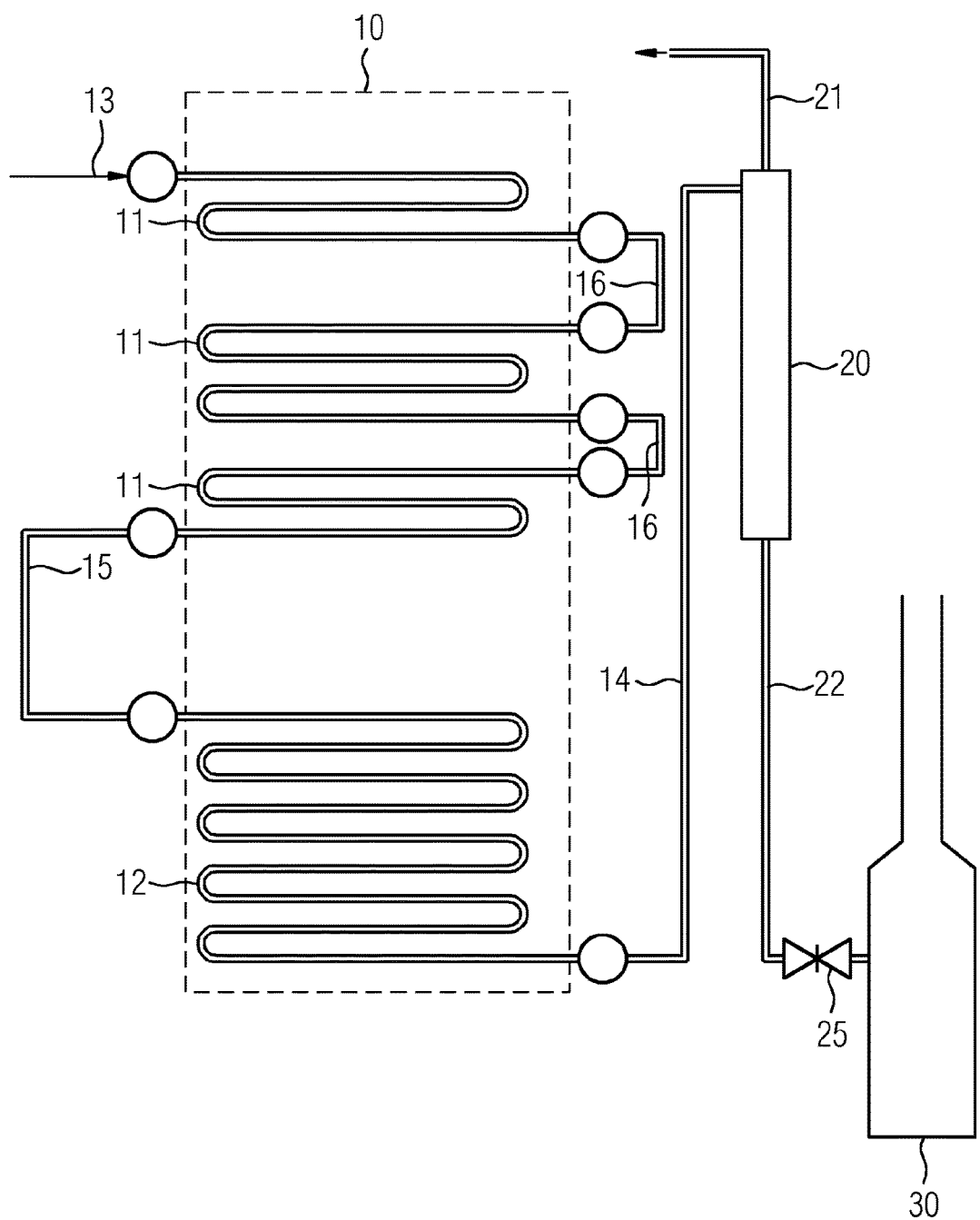
FIG. 1 diagrammatically shows a known arrangement of a waste-heat steam generator.

FIG. 1 shows, in a highly diagrammatic manner, the basic structure of waste-heat steam generators of vertical design which are currently known. Exhaust gas from a gas turbine (not shown in more detail) flows through the exhaust-gas channel 10 of the waste-heat steam generator from bottom to top. Inside the exhaust-gas channel 10, there are arranged in the vertical direction a number of heating surfaces 11 and 12 which are flowed through by a flow medium from the feed water/steam circuit of a steam turbine. Here, heat is transferred from the exhaust gas to the flow medium and can thus be used for the further energy conversion in the steam turbine such that the overall result is a relatively high degree of efficiency for a gas and steam turbine plant.

The various heating surfaces are arranged in the exhaust-gas channel 10 in such a manner that, on the exhaust-gas side, the preheater heating surfaces 11 are in principle arranged downstream of the at least one evaporator heating surface 12 and further superheater heating surfaces (not shown). Arrangements which are currently known, however, have a significantly more complex structure with partially interengaging heating-surface arrangements. On the side of the flow medium, the preheater heating surfaces 11 are, in contrast, arranged downstream of the actual evaporator heating surface 12, such that cool feed water 13 flowing into the preheater heating surfaces 11 is heated moderately in the relatively cold part of the exhaust-gas channel 10, and only afterwards is evaporated in the relatively hot part of the exhaust-gas channel 10, in the evaporator heating surfaces 12 arranged therein.

Each of the heating surfaces 11 and 12 consists of a multiplicity of pipes which are arranged next to one another and which are connected to one another via respective—diagrammatically depicted—collectors at the inputs and outputs of the heating surfaces 11 and 12 such that an equalization of the through-flowing flow medium through the respective pipe assembly of a heating surface occurs. In the arrangement shown in FIG. 1, there are arranged, in the exhaust-gas channel 10, three preheater heating surfaces 11 which are connected to one another via corresponding collectors and connecting lines 16. The flow medium exiting the last preheater heating surface is then guided into the evaporator heating surface 12 via a further connecting line 15. At the output of the single evaporator heating surface 12 shown here, there is a link to a water separator 20 via a further collector and a further connecting line 14. Non-evaporated flow medium ejected from the evaporator heating surface 12 during the start-up of the waste-heat steam generator is thus introduced, together with evaporated flow medium, into the water separator 20, where it is separated. The evaporated flow medium can be fed, via a steam line 21, for example to a further superheater heating surface, while the non-evaporated flow medium can be fed, via a drain valve 25 and an atmospheric expansion device 30, to the feed water/steam circuit, part of this again as feed water.

Figure 2:
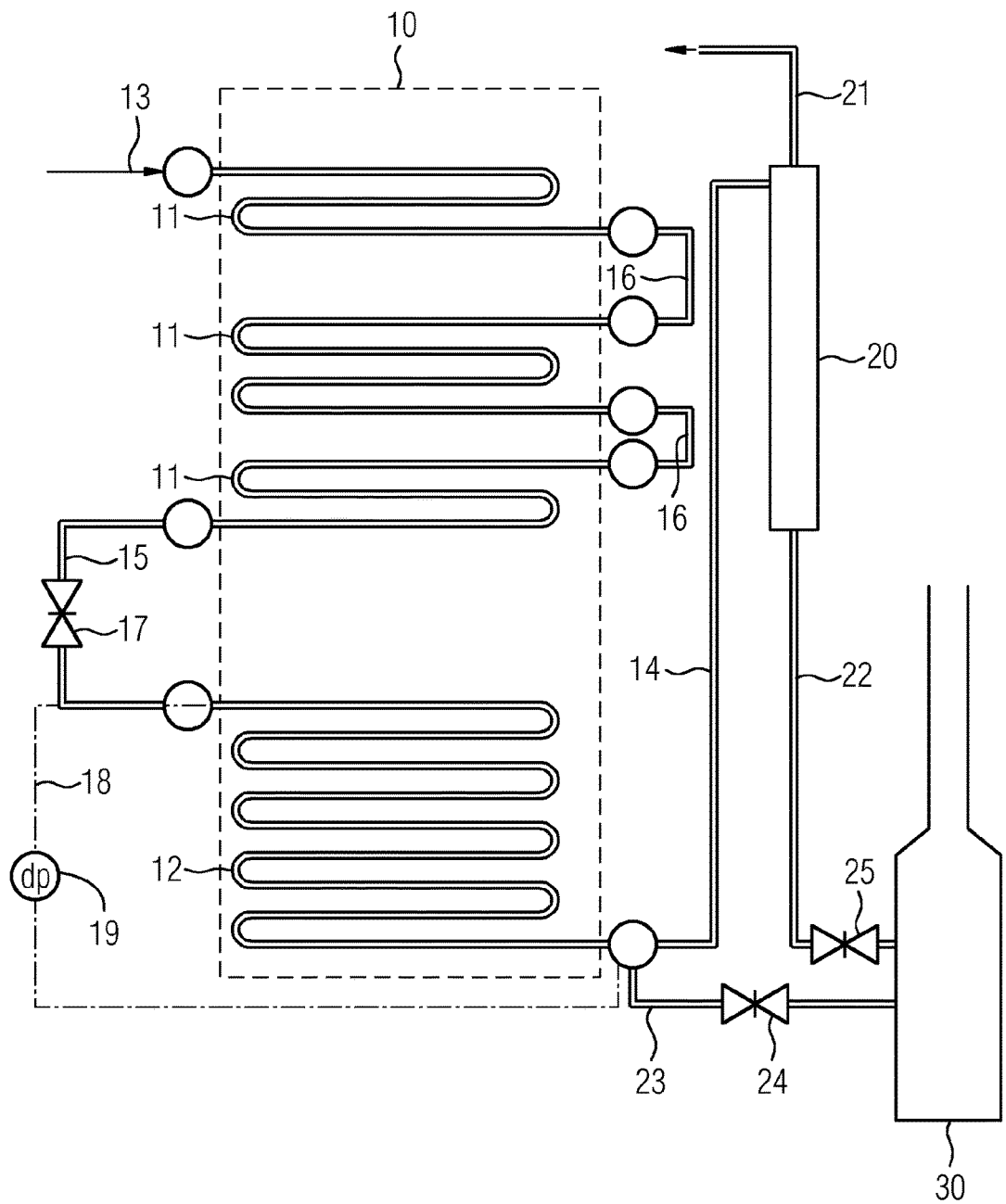
FIG. 2 diagrammatically shows a known arrangement of an improved solution for a waste-heat steam generator.

Unlike the arrangement shown in FIG. 1, in which all the heating surfaces 11 and 12 have to be completely filled prior to the start-up, FIG. 2 shows an arrangement in which the inflow of feed water into the evaporator heating surface 12 can be regulated. For this purpose, provision is made for a valve 17, in the connecting line 15, between the last preheater heating surface and the evaporator heating surface 12, and also a dewatering line 23 with a valve 24 between the evaporator heating surface 12 and the atmospheric expansion device 30. Furthermore, parallel to the evaporator heating surface 12, there are provided a measurement line 18 and a pressure-measurement device 19 for measuring the level of the feed water in the evaporator heating surface 12. This (partial) filling of the evaporator heating surface 12, which is regulable by means of the valves 17 and 24, allows the water ejection from the evaporator heating surface 12 during the start-up to be reduced.

Figure 3:
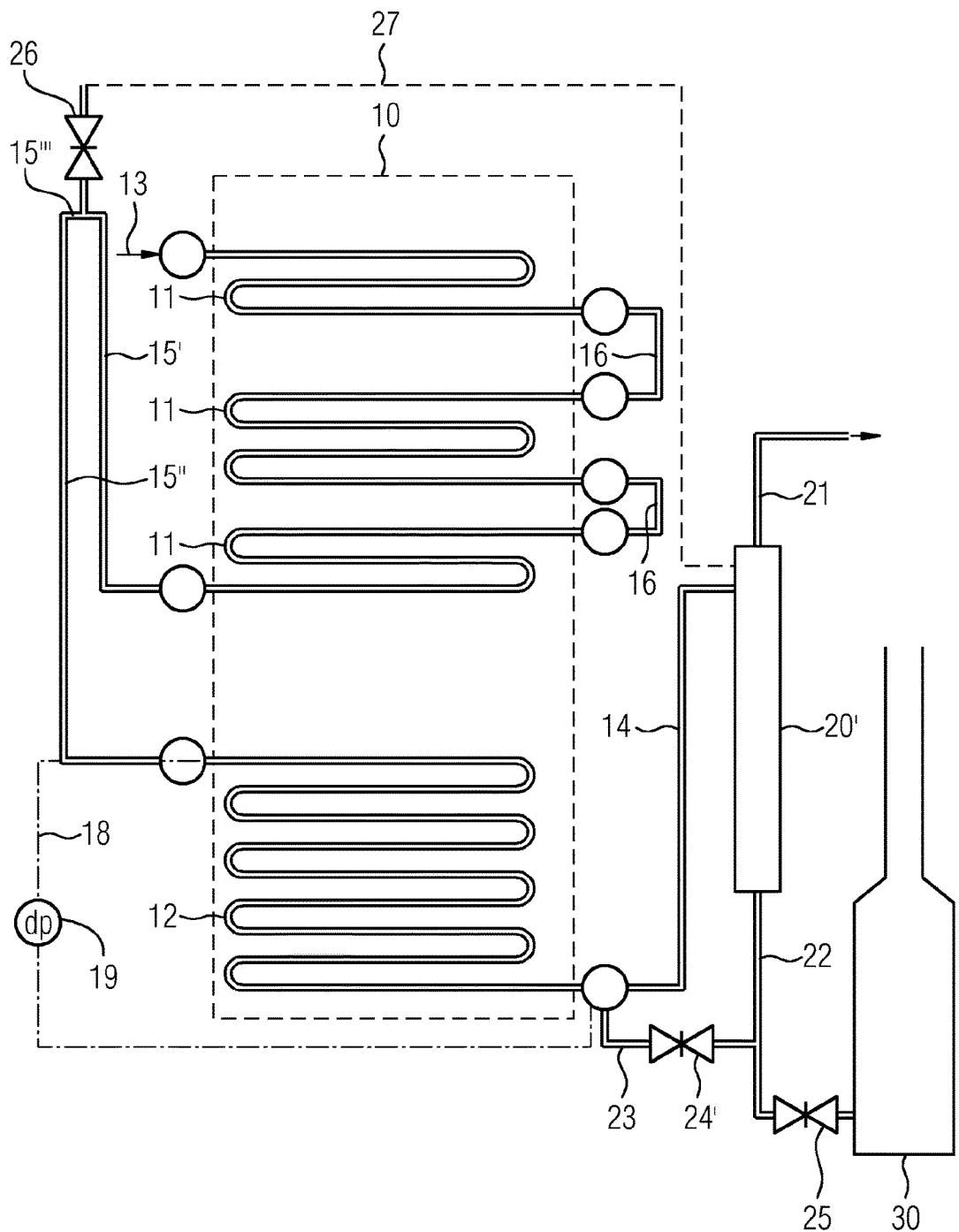
FIG. 3 diagrammatically shows a design and arrangement, according to the invention, of a waste-heat steam generator.

A significant improvement can be achieved if, as shown in FIG. 3, outside the exhaust-gas channel 10 and between the last of the preheater heating surfaces 11 and the evaporator heating surface 12 on the feed-water side, there is arranged an excess pipe length system which is designed in such a way that, after the complete filling of the preheater heating surfaces 11, feed water, in a riser 15' of the excess pipe length system, reaches an overflow 15''' and thus passes into the evaporator heating surface 12 via a down pipe 15''. Unlike the arrangement shown in FIG. 2, feed water can here be introduced into the downstream evaporator heating surface 12 in a regulated manner without further pressurization in the preheater heating surfaces 11. Prior to the start-up of the gas and steam turbine plant, the evaporator heating surface 12 can thus be partially filled to such an extent that an optimization between minimum water ejection and optimized start-up time can be achieved.

Additional measures, such as dewatering valves 24' and 25 for dewatering the evaporator heating surface 12 and/or a vent line 27 with a vent valve 26, allow the water level of the feed water in the evaporator heating surface 12 to be adjusted, independently of the system pressure, prior to each starting state. In order to measure the water level in the evaporator heating surface 12 for the regulation, a suitable level measurement means is additionally installed. For this purpose, parallel to the at least one evaporator heating surface 12, there are advantageously provided—as also in FIG. 2—a measurement line 18 and a pressure-measurement device 19 for measuring the level of the feed water in the at least one evaporator heating surface 12. As a result of the vent line being connected to the steam line 21 for discharging steam from the water separator 20', and not directly to the atmosphere, venting of the excess pipe length can take place without any appreciable pressure drop in the evaporator heating surface. As a result of the valve 24' being integrated upstream of the valve 25, the valve 24' can be designed as a simple "Open/Close" valve, while the actual regulation of the dewatering of the evaporator heating surface 12 takes place by way of the valve 25.

The invention claimed is:

1. A waste-heat steam generator, comprising:
an exhaust-gas channel in which at least one evaporator heating surface and at least one preheater heating surface are arranged, wherein the at least one evaporator heating surface and the at least one preheater heating surface are connected to one another in such a way that, on a feed-water side, the at least one preheater heating surface is arranged upstream of the at least one evaporator heating surface, and
a water separator which is arranged downstream of the at least one evaporator heating surface on the feed-water side,
wherein outside the exhaust-gas channel and between the at least one preheater heating surface and the at least one evaporator heating surface on the feed-water side, there is arranged an excess pipe length system which is designed in such a way that, after the complete filling of the at least one preheater heating surface with feed water, the feed water, in a riser of the excess pipe length system, reaches an overflow and thus passes into the at least one evaporator heating surface via a down pipe, and
wherein between the at least one evaporator heating surface and an atmospheric expansion device, there is provided a dewaterinq line with at least one dewaterinq valve for dewaterinq the at least one evaporator heating surface.

2. The waste-heat steam generator as claimed in claim 1, wherein between the overflow of the excess pipe length system and a steam discharge line of the water separator, there is provided a vent line with a vent valve.

3. The waste-heat steam generator as claimed in claim 1, wherein parallel to the at least one evaporator heating surface, there is provided a measurement line and a pressure-measurement device for measuring the level of the feed water in the at least one evaporator heating surface.

4. The waste-heat steam generator as claimed in claim 1, wherein the waste-heat steam generator is of vertical design.

5. A waste-heat steam generator, comprising:

an exhaust-gas channel in which at least one evaporator heating surface and at least one preheater heating surface are arranged, wherein the at least one evaporator heating surface and the at least one preheater heating surface are connected to one another in such a way that, on a feed-water side, the at least one preheater heating surface is arranged upstream of the at least one evaporator heating surface, and a water separator which is arranged downstream of the at least one evaporator heating surface on the feed-water side, wherein outside the exhaust-gas channel and between the at least one preheater heating surface and the at least one evaporator heating surface on the feed-water side, there is arranged an excess pipe length system which is designed in such a way that, after the complete filling of the at least one preheater heating surface with feed water, the feed water, in a riser of the excess pipe length system, reaches an overflow and thus passes into the at least one evaporator heating surface via a down pipe, and wherein between the overflow of the excess pipe length system and a steam discharge line of the water separator, there is provided a vent line with a vent valve.

* * * * *